Dec. 6, 1960 T. J. WEIR 2,963,135
SPRING LOADED DRIVE
Filed Dec. 19, 1958 2 Sheets-Sheet 1

INVENTOR.
THOMAS J. WEIR.

BY Lockwood, Galt, Woodard & Smith.
ATTORNEYS.

Dec. 6, 1960

T. J. WEIR 2,963,135

SPRING LOADED DRIVE

Filed Dec. 19, 1958

INVENTOR
THOMAS J. WEIR.
BY
Lockwood, Galt, Woodard & Smith.
ATTORNEYS.

United States Patent Office 2,963,135
Patented Dec. 6, 1960

2,963,135

SPRING LOADED DRIVE

Thomas J. Weir, Indianapolis, Ind., assignor to Schwitzer Corporation, Indianapolis, Ind., a corporation Filed Dec. 19, 1958, Ser. No. 781,737

12 Claims. (Cl. 192—57)

This invention relates generally to fluid couplings and, in particular, to a spring loaded fluid coupling for driving accessory devices such as are commonly associated with internal combustion engines, such, for example, as cooling fans or the like.

With the increasing use of engine accessories such as radiator cooling fans, electric generators, power steering pumps and the like, on modern automobiles, a significant portion of the power developed by the auto engine must be used to drive these accessories. Generally speaking, the power thereby consumed increases as the speed of the auto engine or driving means increases, but in many instances the demand for the useful output of such a driven accessory, beyond a certain maximum speed, increases, if at all, at a rate which is much less than that resulting from the increase in speed of the engine.

A notable example of this condition is the radiator cooling fan. If such accessory is coupled directly to the engine, the power consumed thereby increases approximately as the cube of the engine speed, whereas the necessary speed for the fan, as an agency for inducing heat exchanging air flow through the radiator, in most cases does not increase in proportion to the engine speed. Thus, at low engine speeds it is desirable to provide a substantially non-slip coupling between the engine and the fan and a slipping type coupling at high engine speed to thereby limit the torque transfer between the engine and the fan.

It is the primary object of the present invention to provide a fluid coupling device in which the driving element is formed to provide a maximum of fluid shearing surface between the driving and driven elements so that slippage between the driving and driven elements occurs at relatively high input speeds, the driving element being spring loaded into frictional engagement with the driven element so that a substantially non-slip drive exists between the elements at relatively low input speeds.

A further object of the present invention is to provide a fluid coupling in which the driving element is formed so as to impart a circular component of movement to the fluid in the coupling housing to thereby increase the transfer of heat generated in the coupling to the housing for dissipation.

A further object of the present invention is to provide a fluid coupling in which the driving element is spring loaded into frictional engagement with the driven element to provide a non-slip drive at low input speeds, the spring loading being relieved in response to centrifugal force to permit torque transfer by viscous fluid shear for higher input speeds.

The full nature of the invention will be understood from the accompanying drawings and the following description and claims.

Figure 1:
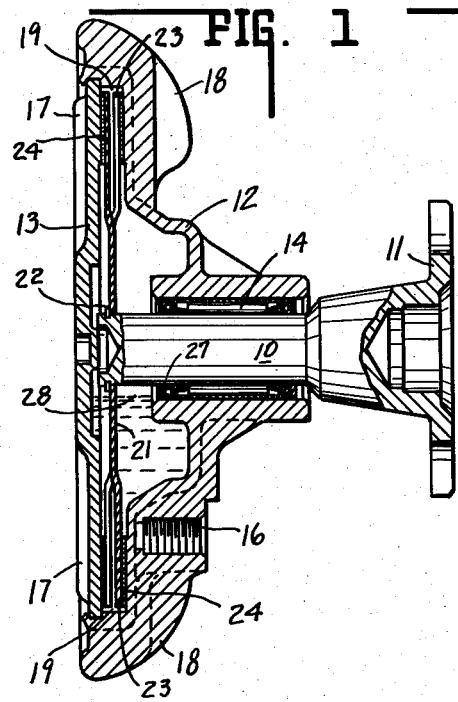
Fig. 1 is a section taken axially through a fluid coupling that may be adapted to the driving of an engine cooling fan.
Figure 2:
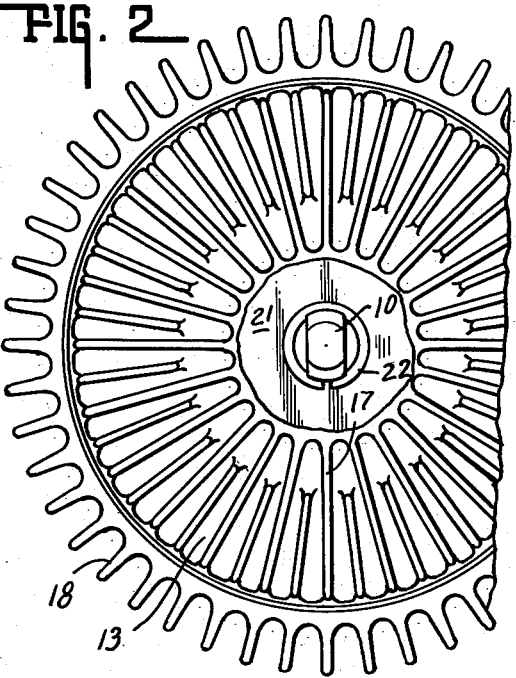
Fig. 2 is a front elevation of the coupling housing.
Figure 3:
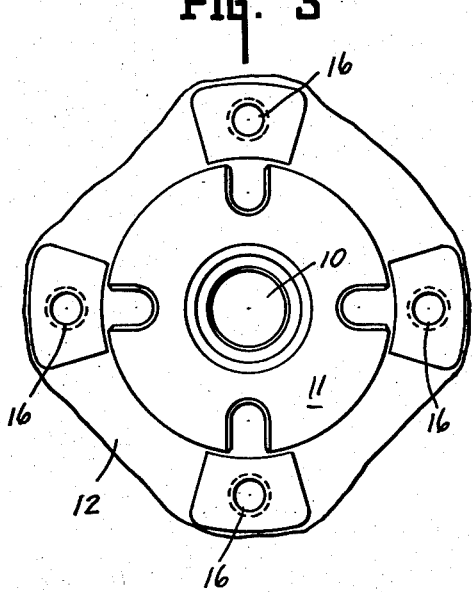
Fig. 3 is a rear elevation of the coupling housing.

In the drawings there is illustrated as one example of the invention a fluid coupling for driving an engine cooling fan; it should, however, be kept in mind that the coupling might be similarly utilized for transmitting torque from a source of power, such as an automobile engine to other driven accessories. Referring initially to Fig. 1, there is shown a drive shaft or spindle 10 having a flanged end 11 which is adapted to be bolted to a fan pulley (not shown), the fan pulley being driven in conventional fashion from the crankshaft of the engine. A fluid housing, comprising the cup-like section 12 and the cover plate 13, is mounted by means of bearing 14 for free rotation about the drive shaft. The cup-like section is provided with a series of threaded apertures 16 which are adapted to receive bolts for securing fan blades (not shown) to the section 12, the fan blades thus rotating with the housing.

The cover plate 13 of the housing is formed with an annular series of radially extending fins 17 for heat radiation and dissipation. The cup-shaped section 12 is also formed to provide a series of spaced peripheral fins 18 which perform the same function. The housing, including the section 12 and the cover plate 13 encompass a fluid chamber, these members being formed to provide opposed faces defining a narrowed, peripheral chamber portion 19.

A disc-shaped rotor or drive plate 21 has a central, truncated, circular aperture which accommodates the suitably formed end of the drive shaft 10, a snap ring 22 serving to lock the drive plate on the shaft 10 for rotation therewith.

Figure 4:
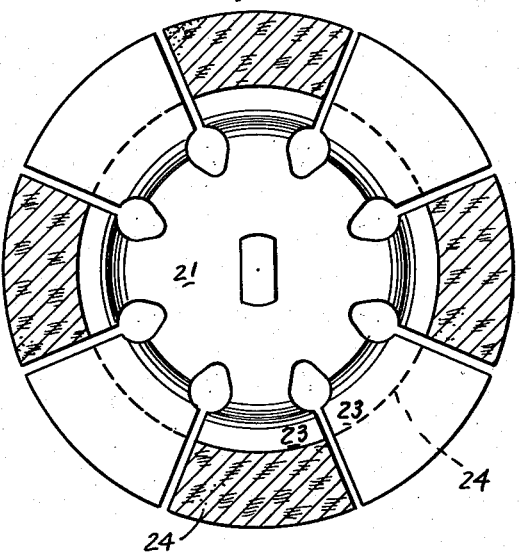
Fig. 4 is a rear elevation of the driving element forming a component of the coupling.

As may best be seen in Figs. 1 and 4, the drive plate is formed of relatively thin metal stock having some resiliency and is radially slotted to provide a series of spaced fingers 23 which alternately extend in opposite directions out of the plane of the drive plate. The peripheral marginal area each of the fingers is provided with a frictional surface or facing indicated at 24, the frictional facing being applied to opposite sides of adjacent fingers. The material forming the facing 24 may take the form of cork, brake lining material, or other nonmetallic materials having similar structural and frictional characteristics. When the drive plate is installed in the housing, the extending fingers are deformed slightly, their inherent resiliency thereby urging their faced areas into engagement with the adjacent surfaces of the housing.

A suitable high viscosity fluid having frictional shearing and lubricating characteristics is introduced into the fluid chamber within the housing through a fill plug (not shown). The flexible seal 27 serves to retain the fluid in the housing. The fluid chamber may be filled to a level indicated by the broken line 28 in Fig. 1. Experimental work has indicated that silicone oils of the type discussed in the General Electric Review, volume 49, No. 11, of November 1946, pages 14–18, "Silicone Oils, Properties and Applications," by Dr. Donald F. Wilcock, are preferable for use in the apparatus herein described. Other types of oil which maintain to a maximum degree their viscosity at higher temperatures, provide the maximum transmission of torque and provide maximum lubrication might also be used.

In operation, as the rotor is driven by the drive shaft 10, the fluid will be distributed by centrifugal force into the narrowed peripheral portion 19 of the fluid chamber. Since the resilience of the fingers 23 urges them against the adjacent faces of the housing, the frictional resistance developed at the area of engagement of the facings 24 and the adjacent housing faces will produce substantially a direct, non-slip drive between the rotor and the housing as long as the drive plate is moving at relatively low speed. Thus, at low speed, or where the torque requirement of the driven member does not exceed the torque transfer capacity of the coupling, torque is transmitted by wet clutch action, that is, without slip.

Since the center of gravity of each of the fingers 23 is disposed outwardly from the major plane of the drive plate 21, any force applied to the fingers in a radially outward direction, such as centrifugal force, will tend to straighten the offset in the fingers and move them toward the major plane of the drive plate thereby breaking the fingers away from the adjacent housing faces. As the drive shaft, and consequently the drive plate 21 increase in speed, centrifugal force will thus relieve the force exerted by the fingers on the adjacent housing faces and break them away therefrom. The drive plate will then rotate relative to the housing with torque being transferred from the drive plate to the housing by the resistance to shearing stress of the fluid in the chamber. The coupling herein described thus provides a substantially non-slip, wet clutch drive between the rotor or drive plate and the housing for relatively low input speeds and a viscous shear drive therebetween for higher input speeds.

Figure 5:
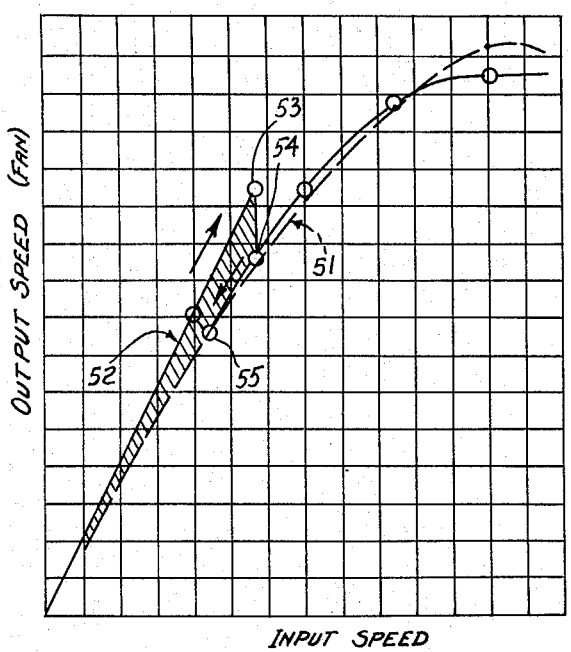
Fig. 5 is a curve illustrating the performance characteristics of a coupling embodying the present invention.

Referring now to Fig. 5, the advantages in this mode of operation will be apparent. The broken line curve 51 illustrates input speed vs. output speed characteristic of a coupling utilized to drive a fan and which omits the fingers 23 and relies for torque transfer solely on the resistance to shear of the fluid in the housing. As will be evident from Fig. 5, the output speed gradually declines with increasing input speeds from a point substantially at the point of origin of the curve.

The solid line curve 52 illustrates the performance characteristics of a coupling embodying the present invention, that is, incorporating the fingers 23. As the input speed increases, there is a substantially no-slip drive until point 53 is reached. At this point centrifugal force relieves the force exerted by the fingers 23 on the adjacent housing faces and slippage between the drive plate 21 and the driven housing occurs. Because of the variation in the coefficient of friction under the no-slip condition as compared to the slipping condition, there is a drop in fan speed, or output speed, measured by the ordinal difference between points 53 and 54. As the input speed is further increased torque is transmitted primarily by viscous shear to the driven member with the output reaching a maximum value which represents the torque transfer limit of the coupling.

On the decreasing input speed curve, a hysteresis effect will be apparent. That is, as the input speed is lowered to the abscissa value of point 54, the output speed does not thereupon increase to the ordinal value of point 53. Since the coupling is slipping as the input speed is lowered to the abscissa value of point 53, the input speed must be lowered to the abscissa value of point 55 before slippage stops and a direct drive ratio of one to one is obtained.

The cross hatched area represents the improvement in torque transfer of a fluid coupling embodying the present invention over one depending only upon viscous shear. The improved output speed characteristic for input speeds below a value of the order of 1750 r.p.m. can represent an improvement of approximately 10% in, for example, the cooling of an air conditioned auto, and this improved characteristic is in the area where it is most needed, that is, at low speeds.

It should be noted that use of a single drive plate with fingers projecting in alternately opposite directions from the plane of the plate forces the fluid to pass between the space bounded by the adjacent fingers of the drive plate and thereby presents a maximum of shearing faces to the fluid. It should be further noted that with the drive plate formed as herein described, the edge surfaces of the fingers propel the fluid to provide it with a circular component of movement with relation to the housing. The motion thereby imparted to the fluid causes a circulation thereof which facilitates heat transfer to the housing for dissipation from the outer surfaces of the housing.

By varying the design of the fingers 23, it will be evident that the point at which slippage occurs can be varied. Varying the weight of these fingers may also be utilized to vary the characteristics of the coupling. While the foregoing description has referred to a design wherein the force exerted by the fingers on the adjacent housing faces decreases with speed, it will be apparent that the configuration of the fingers could be designed so that the force exerted thereby on the adjacent housing faces would increase, rather than decrease with an increase in input speed.

While the invention has been disclosed and described in some detail in the drawings and foregoing description, they are to be considered as illustrative and not restrictive in character, as other modifications may readily suggest themselves to persons skilled in the art and within the broad scope of the invention, reference being had to the appended claims.

The invention claimed is:

1. In a fluid coupling, the combination comprising a fluid retaining housing having spaced faces defining opposite sides of a chamber containing a supply of fluid, a disc-shaped rotor disposed for rotation in said chamber relative to said housing with its side surfaces extending in face-to-face relation with the faces of said housing, the peripheral area of said rotor being generally radially slotted to provide resilient fingers formed to extend in alternately opposite directions out of the plane of the rotor so as to engage said housing faces, a frictional facing carried by each of said fingers at its area of engagement with the housing face, and means for imparting a variable speed input drive to said coupling, whereby at low input speeds the frictional engagement of said fingers with said housing faces provides a substantially non-slip torque transmitting connection therebetween and at high input speeds centrifugal force relieves the engagement of said fingers with said housing faces to permit the shearing action of the fluid between said fingers and said housing faces to produce a slipping, torque transmitting connection therebetween, the edge surfaces of said fingers providing a circular component of motion to said fluid with relation to said housing thereby facilitating heat transfer to said housing.

2. In a fluid coupling, the combination comprising a fluid retaining housing having spaced faces defining opposite sides of a chamber containing a supply of fluid, a rotor disposed for rotation in said chamber relative to said housing having side surfaces extending in face-to-face relation with the faces of said housing, the peripheral area of said rotor being generally radially slotted to provide resilient fingers formed to extend in alternately opposite directions out of the plane of the rotor so as to engage said housing faces, and means for imparting a variable speed input drive to said coupling, whereby at low input speeds the frictional engagement of said fingers with said housing faces provides a substantially non-slip torque transmitting connection therebetween and at high input speeds centrifugal force relieves the engagement of said fingers with said housing faces to permit the shearing action of the fluid between said fingers and said housing faces to produce a slipping, torque transmitting connection therebetween, the edge surfaces of said fingers providing a circular component of motion to said fluid with relation to said housing thereby facilitating heat transfer to said housing.

3. In a fluid coupling, the combination comprising a fluid retaining housing having spaced faces defining opposite sides of a chamber containing a supply of fluid, a rotor disposed for rotation in said chamber relative to said housing having side surfaces extending in face-to-face relation with the faces of said housing, generally radial fingers carried by said rotor and formed to extend in alternately opposite directions out of the plane of the rotor side surfaces to engage said housing faces, a frictional facing carried by said fingers at their area of engagement with the housing face, and means for imparting a variable speed input drive to said coupling, whereby at low input speeds the frictional engagement of said fingers with said housing faces provides a substantially non-slip torque transmitting connection therebetween and at high input speeds centrifugal force relieves the engagement of said fingers with said housing faces to permit the shearing action of the fluid between said fingers and said housing faces to produce a slipping, torque transmitting connection therebetween, the edge surfaces of said fingers providing a circular component of motion to said fluid with relation to said housing thereby facilitating heat transfer to said housing.

4. In a fluid coupling, the combination comprising a fluid retaining housing having spaced faces defining opposite sides of a chamber containing a supply of fluid, a rotor disposed for rotation in said chamber relative to said housing having side surfaces extending in face-to-face relation with the faces of said housing, generally radial fingers carried by said rotor and formed to extend in alternately opposite directions out of the plane of the rotor side surfaces to engage said housing faces, and means for imparting a variable speed input drive to said coupling, whereby at low input speeds the frictional engagement of said fingers with said housing faces provides a substantially non-slip torque transmitting connection therebetween and at high input speeds centrifugal force relieves the engagement of said fingers with said housing faces to permit the shearing action of the fluid between said fingers and said housing faces to produce a slipping, torque transmitting connection therebetween, the edge surfaces of said fingers providing a circular component of motion to said fluid with relation to said housing thereby facilitating heat transfer to said housing.

5. A fluid coupling mechanism comprising a metallic housing having spaced faces defining opposite sides of a chamber containing a supply of fluid, a rotor including a disc-shaped member disposed for rotation between the spaced faces of said housing, the peripheral area of said disc-shaped member being generally radially slotted to provide resilient fingers formed to extend in alternately opposite directions out of the plane of said member to engage said housing faces, a frictional facing carried by each of said fingers at its area of engagement with the housing face, and means for driving said rotor at variable speed, whereby at low rotor speeds the frictional engagement of said fingers with said housing faces provides a substantially non-slip, torque transmitting connection therebetween and at high rotor speeds centrifugal force relieves the engagement of said fingers with said housing faces to permit the shearing action of the fluid between said fingers and said housing faces to produce a slipping torque-transmitting connection therebetween, the edge surfaces of said fingers providing a circular component of motion to said fluid with relation to said housing thereby facilitating heat transfer to said housing.

6. A fluid coupling mechanism comprising a metallic housing having spaced faces defining opposite sides of a chamber containing a supply of fluid, a rotor including a disc-shaped member disposed for rotation between the spaced faces of said housing, generally radial fingers carried by said disc-shaped member and formed to extend in alternately opposite direction out of the plane of said member to engage said housing faces, a frictional facing carried by each of said fingers at its area of engagement with the housing face, and means for driving said rotor at variable speed, whereby at low rotor speeds the frictional engagement of said fingers with said housing faces provides a substantially non-slip, torque transmitting connection therebetween and at high rotor speeds centrifugal force relieves the engagement of said fingers with said housing faces to permit the shearing action of the fluid between said fingers and said housing faces to produce a slipping torque-transmitting connection therebetween, the edge surfaces of said fingers providing a circular component of motion to said fluid with relation to said housing thereby facilitating heat transfer to said housing.

7. A fluid coupling mechanism comprising a metallic housing having spaced faces defining opposite sides of a chamber containing a supply of fluid, a rotor including a disc-shaped member disposed for rotation between the spaced faces of said housing, generally radial fingers carried by said disc-shaped member and formed to extend in alternately opposite directions out of the plane of said chamber to engage said housing faces, and means for driving said rotor at variable speed, whereby at low rotor speeds the frictional engagement of said fingers with said housing faces provides a substantially non-slip, torque transmitting connection therebetween and at high rotor speeds centrifugal force relieves the engagement of said fingers with said housing faces to permit the shearing action of the fluid between said fingers and said housing faces to produce a slipping torque transmitting connection therebetween, the edge surfaces of said fingers providing a circular component of motion to said fluid with relation to said housing thereby facilitating heat transfer to said housing.

8. A fluid coupling mechanism comprising a housing having spaced faces defining opposite sides of a chamber containing a supply of fluid, a rotor including a disc-shaped member disposed for rotation between the spaced faces of said housing, the peripheral area of said rotor being generally radially slotted to provide resilient fingers which normally engage the adjacent housing face, a frictional facing carried by each of said fingers at its area of engagement with the housing face, and means for driving said rotor at variable speed, whereby at low rotor speeds the frictional engagement of said fingers with said housing face provides a substantially non-slip, torque transmitting connection therebetween and at high rotor speeds the shearing action of the fluid between said fingers and said housing face provides a slipping torque-transmitting connection therebetween.

9. A fluid coupling mechanism comprising a housing having spaced faces defining opposite sides of a chamber containing a supply of fluid, a rotor including a disc-shaped member disposed for rotation between the spaced faces of said housing, said member having a portion extending into engagement with at least one of said housing faces but movable under a radially directed force out of engagement therewith, a frictional facing carried by said member at its area of engagement with the housing face, and means for driving said rotor at variable speed, whereby at low rotor speeds the frictional engagement of said member with said housing face provides a substantially non-slip, torque transmitting connection therebetween and at high rotor speeds the shearing action of the fluid between said member and said housing faces provides a slipping torque-transmitting connection therebetween.

10. A fluid coupling mechanism comprising a housing having spaced faces defining opposite sides of a chamber containing a supply of fluid, a rotor including a disc-shaped member disposed for rotation between the spaced faces of said housing to provide a fluid shear torque transmitting connection therebetween, the peripheral area of said rotor being generally radially slotted to provide resilient fingers which extend out of the plane of the disc-shaped member to normally engage the adjacent housing face, a frictional facing carried by each of said fingers at its area of engagement with the housing face, and means for driving said rotor at variable speed, centrifugal force acting on said fingers serving to vary the force of engagement of said fingers and the adjacent housing face with changes in rotor speed.

11. A fluid coupling mechanism comprising a housing having spaced faces defining opposite sides of a chamber containing a supply of fluid, a rotor including a disc-shaped member disposed for rotation between the spaced faces of said housing to provide a fluid shear torque transmitting connection therebetween, the peripheral area of said rotor being generally radially slotted to provide resilient fingers which extend out of the plane of the disc-shaped member to normally engage the adjacent housing face, and means for driving said rotor at variable speed, centrifugal force acting on said fingers serving to vary the force of engagement of said fingers and the adjacent housing face with changes in rotor speed.

12. A fluid coupling mechanism comprising a housing having spaced faces defining opposite sides of a chamber containing a supply of fluid, a rotor including a disc-shaped member disposed for rotation between the spaced faces of said housing to provide a fluid shear torque transmitting connection therebetween, generally radial fingers carried by said disc-shaped member and extending out of the plane thereof to normally engage the adjacent housing face, and means for driving said rotor at variable speed, centrifugal force acting on said fingers serving to vary the force of engagement of said fingers and the adjacent housing face with changes in rotor speed.

References Cited in the file of this patent

UNITED STATES PATENTS

| 1,282,522 | Ayres | Oct. 22, 1918 |
| 2,175,418 | Wales | Oct. 10, 1939 |
| 2,214,416 | Holtz | Sept. 10, 1940 |
| 2,599,292 | Steinbach et al. | June 3, 1952 |
| 2,837,193 | Wilder | June 3, 1958 |

FOREIGN PATENTS

| 125,531 | Austria | Nov. 25, 1931 |